(12) United States Patent
Onishi et al.

(10) Patent No.: US 7,380,953 B2
(45) Date of Patent: Jun. 3, 2008

(54) DISPLAY DEVICE AND ELECTRONIC APPARATUS

(75) Inventors: Yasunori Onishi, Matsumoto (JP); Hisanori Kawakami, Matsumoto (JP); Taketoshi Masamoto, Matsumoto (JP)

(73) Assignee: Seiko Epson Corporation (JP)

( * ) Notice: Subject to any disclaimer, the term of this patent is extended or adjusted under 35 U.S.C. 154(b) by 75 days.

(21) Appl. No.: 10/698,035

(22) Filed: Oct. 30, 2003

(65) Prior Publication Data

US 2004/0136155 A1    Jul. 15, 2004

(30) Foreign Application Priority Data

Oct. 30, 2002    (JP)    ............... 2002-316081

(51) Int. Cl.
*G01D 11/28*    (2006.01)
*F21V 7/04*    (2006.01)

(52) U.S. Cl. .............. 362/29; 349/61; 349/62

(58) Field of Classification Search ............... 362/603, 362/606, 607, 608, 609, 615, 29; 349/61, 349/62, 65, 74, 114, 113; 361/680–683; 455/566

See application file for complete search history.

(56) References Cited

U.S. PATENT DOCUMENTS

| | | | |
|---|---|---|---|
| 4,516,834 A * | 5/1985 | Cascini ............... | 349/81 |
| 6,124,919 A | 9/2000 | Kubo et al. | |
| 6,466,292 B1 * | 10/2002 | Kim ............... | 349/143 |
| 6,574,487 B1 * | 6/2003 | Smith et al. ............... | 455/566 |
| 6,744,481 B2 * | 6/2004 | Cheng ............... | 349/113 |
| 6,816,217 B2 * | 11/2004 | Sone ............... | 349/114 |
| 6,822,711 B1 | 11/2004 | Yoshida et al. | |
| 6,831,711 B2 * | 12/2004 | Choi et al. ............... | 349/74 |
| 6,853,418 B2 * | 2/2005 | Suzuki et al. ............... | 349/113 |

(Continued)

FOREIGN PATENT DOCUMENTS

JP    3-73927    3/1991

(Continued)

OTHER PUBLICATIONS

Communication from Korean Patent Office re: related application.

(Continued)

*Primary Examiner*—Thomas M. Sember
(74) *Attorney, Agent, or Firm*—Harness, Dickey & Pierce, P.L.C.

(57) ABSTRACT

A display device is provided which offers double-sided display and achieves a thin structure and also which prevents deterioration in display quality of each of front and back display units when an illumination unit such as a backlight is shared by these display units. The display device includes a first display unit having a display surface on the front surface thereof; a second display unit having a display surface on the rear surface thereof; and a common illumination unit interposed between the first display unit and the second display unit, for illuminating both the first display unit and the second display unit with light. The illumination unit includes a light-guiding member having a first light-emitting surface opposed to the first display unit and a second light-emitting surface opposed to the second display unit, and a transflector is interposed between the second light-emitting surface of the light-guiding member and the second display unit.

17 Claims, 7 Drawing Sheets

U.S. PATENT DOCUMENTS

| | | | |
|---|---|---|---|
| 6,925,313 B2 | 8/2005 | Kweon et al. | |
| 6,927,818 B2 | 8/2005 | Hinata et al. | |
| 7,034,799 B2 * | 4/2006 | Lee | 345/102 |
| 7,077,536 B2 * | 7/2006 | Konomi | 362/29 |
| 7,184,012 B1 | 2/2007 | Kim | |
| 2001/0049293 A1 * | 12/2001 | Shimazaki | 455/550 |
| 2003/0103174 A1 | 6/2003 | Han et al. | 349/61 |
| 2003/0231483 A1 * | 12/2003 | Higashiyama | 362/31 |
| 2003/0234897 A1 * | 12/2003 | Ozawa | 349/65 |
| 2004/0100423 A1 * | 5/2004 | Nagakubo et al. | 345/40 |
| 2005/0073627 A1 * | 4/2005 | Akiyama | 349/65 |

FOREIGN PATENT DOCUMENTS

| | | | |
|---|---|---|---|
| JP | 2000206523 A * | 7/2000 | |
| JP | 2001051251 A * | 2/2001 | |
| JP | 2001-67049 | 3/2001 | |
| JP | 2001-075093 | 3/2001 | |
| JP | 2001-290445 | 10/2001 | |
| JP | 2002-93229 | 3/2002 | |
| JP | 2002-189230 | 7/2002 | |
| JP | 2002-287144 | 10/2002 | |
| JP | 2002-304137 | 10/2002 | |
| JP | 2002-313120 | 10/2002 | |
| JP | 2003-98545 | 4/2003 | |
| JP | 2003-177406 | 6/2003 | |
| JP | 2005-99471 | 4/2005 | |
| KR | 2000-0035051 | 6/2000 | |
| KR | 2001-0030542 | 4/2001 | |
| KR | 2002-0065381 | 8/2002 | |
| WO | WO 03/029884 A1 | 9/2002 | |

OTHER PUBLICATIONS

Communication from Japanese Patent Office issued Jul. 25, 2006 regarding corresponding application.

Communication from Japanese Patent Office issued Aug. 22, 2006 regarding corresponding application.

\* cited by examiner

# DISPLAY DEVICE AND ELECTRONIC APPARATUS

BACKGROUND OF THE INVENTION

1. Field of the Invention

The present invention relates to a display device and an electronic apparatus, and in particular, it relates to the structure of a display device suitably mounted on a portable electronic apparatus.

2. Related Art

In general, an electro-optical device such as a liquid crystal display device or an electro-luminescent display device is used as a display device mounted on a portable electronic apparatus. In particular, a cellular phone has a compact liquid crystal display device mounted in a small casing thereof. In recent years, a cellular phone of a double-sided display type, having compact liquid crystal display devices mounted on the front and back of a thin displaying portion thereof, is commercially available on the market. Such a cellular phone has a pair of liquid crystal display devices accommodated in the displaying portion of the casing thereof so as to lie back to back and placed so as to be visible from both the front and back sides thereof.

Many liquid crystal display devices have a structure in which a backlight serving as an illuminator is disposed behind a liquid crystal panel. Although a reflective liquid crystal display device having no such a backlight is available, its application is limited since its display is invisible in dark places and at night. Although the liquid crystal display device equipped with a backlight has a drawback in thickness, with the recent advancements in higher definition and color display of a compact liquid crystal display device, most portable electronic apparatuses have them mounted thereon. In recent years, there has emerged a transflective liquid crystal display device equipped with a backlight and able to perform both transmissive display and reflective display.

Since a portable electronic apparatus such as the above-mentioned cellular phone has become more compact and thinner year by year, a thin liquid crystal display device is strongly desired in accordance with this trend. In order to meet this requirement, a thinner liquid crystal panel and a thinner backlight are under development.

Unfortunately, the above-mentioned known cellular phone of a double-sided display type has problems in that, since a pair of liquid crystal display devices must be accommodated in its casing so as to lie back to back, it is hard to make the casing thinner, and, even when each of the liquid crystal display devices is made thin, the casing is thicker and heavier than a normal portable phone of a single-sided display type.

One method for solving the above problems lies in that a single backlight is shared by the front and back liquid crystal display devices so as to illuminate a pair of front and back liquid crystal panels. Whereas, in a cellular phone of a double-sided display type, since the display areas of the front and back liquid crystal display devices are generally different from each other, when a single backlight is shared by them as mentioned above, the luminance distribution of a large main panel is affected by an illumination action of the backlight applied on a small sub-panel disposed behind the main panel, thereby causing a risk that a shadow of the sub-panel is reflected in a display image of the main panel and thus its display quality deteriorates.

With this background, the present invention has been made in order to solve the above problems. Accordingly, it is an object of the present invention to provide a display device which offers double-sided display and achieves a thin structure and which prevents deterioration in display quality of both front and back display units when an illuminator such as a backlight is shared by these display units.

SUMMARY OF THE INVENTION

In order to achieve the above-mentioned object, a display device according to the present invention includes a first display unit having a display surface on the front surface thereof; a second display unit having a display surface on the rear surface thereof; and a common illumination unit interposed between the first display unit and the second display unit, for illuminating both the first display unit and the second display unit with light. The illumination unit includes a light-guiding member including a first light-emitting surface opposite the first display unit and a second light-emitting surface opposite the second display unit, and a transflector is interposed between the second light-emitting surface of the light-guiding member and the second display unit.

According to the present invention, with the common illumination unit constructed so as to illuminate both the first display unit and the second display unit with light, one of two illumination units can be eliminated, thereby achieving a thinner and lighter device. Also, with the transflector interposed between the second light-emitting surface of the light-guiding member of the illumination unit and the second display unit, since part of light emitted from the second light-emitting surface of the light-guiding member is transmitted through the transflector and is then directed towards the second display unit, while the second display unit is constructed so as to be illuminated with light, the remaining light emitted from the second light-emitting surface of the light-guiding member can be reflected at the transflector so as to be directed towards the first display unit. Accordingly, it is possible to place a priority on the illumination state of the first display unit, and hence the display quality of the first display unit can be improved.

Also, with the above structure, a transflector may also be interposed between the first light-emitting surface and the first display unit. In this case, the second display unit also obtains an optical effect equivalent to that of the first display unit.

In the display device according to the present invention, the display area of the first display unit may extend so as to two-dimensionally overlap the display area of the second display unit and an area lying outside the display area of the second display unit. With this structure, since the display area of the first display unit extends so as to two-dimensionally overlap not only the display area of the second display unit but also the area outside the display area of the second display unit, light emitted from the common illumination unit towards the second display unit causes the display feature of the first display unit to be optically affected due to the fact that the display area of the second display unit is present behind the first display unit. Hence, a shadow of the display area of the second display unit is sometimes reflected in the display surface of the first display unit. However, in the display device according to the present invention, since the transflector is interposed between the second light-emitting surface of the light-guiding member and the second display unit as described above, the optical affect caused by the second display unit can be reduced, and thus the display quality of the first display unit can be improved.

In the display device according to the present invention, the transflector may have a light-diffusing function. With this structure, the light-diffusing function improves the evenness of illumination light from the illumination unit, thereby further preventing the unevenness of display of the first display unit and the second display unit. In particular, when the display device has a structure in which light reflected at the transflector is diffused, the evenness of light in the light-guiding member is improved, and the illuminance distribution on the first display unit is made uniform, thereby further preventing the unevenness of display of the first display unit.

In the display device according to the present invention, the transflector may have different optical characteristics between an overlapping portion two-dimensionally overlapping the display area of the second display unit, of a region two-dimensionally overlapping between the transflector and the display area of the first display unit, and a portion of the region other than the overlapping portion. With this structure, the transflector has different optical characteristics between the overlapping portion and the remaining portion of the region, thereby making the optical effects of the transflector applied on the display area of the first display unit different between the overlapping portion and the remaining portion. Accordingly, an optical difference, for example, a difference in luminance levels, between the overlapping portion and the remaining portion in the display area of the first display unit can be reduced, or the display quality of the second display unit can be improved.

More particularly, in the case where the transflector is disposed across the entire region, assuming that the second display unit is disposed behind the overlapping portion of the region and another unit is disposed behind the portion other than the overlapping portion, when the transflector is formed so as to have uniform optical characteristics across the entire region, a difference in reflectances between the second display unit and the other unit causes a black shadow or a white shadow of the second display unit to be reflected in the display area of the first display unit. Accordingly, when the second display unit and the other unit have a difference in reflectances therebetween like this, by making the optical characteristics of the transflector different between the overlapping portion and the remaining portion as mentioned above, the foregoing black or white shadow can be less noticeable. Meanwhile, the optical characteristics of the transflector mean characteristics such as a light reflectance, a light transmittance, a light absorptance, and a light-diffusing rate, possibly affecting the display features of the first display unit and the second display unit.

In the display device according to the present invention, the transflector is preferably a thin film composed of a reflective material and having a thickness allowing light to be substantially transmitted therethrough. With this structure, since the transflector is provided with a light transmittivity by adjusting the thickness of a thin film composed of a reflective material, a step such as patterning can be eliminated, thereby easily making the transflector. A thin metal film is preferred as the reflective material. In particular, aluminum, an aluminum alloy, silver, a silver alloy, and the like are preferable as the reflective material.

In the display device according to the present invention, the transflector is preferably a thin film composed of a reflective material and having a plurality of fine apertures dispersed therein such that light is substantially transmitted therethrough. With this structure, since the transflector is provided with a light transmittivity by having the fine apertures dispersed in a thin film composed of a reflective material, the light transmittance is accurately controlled by changing the aperture area ratio of the apertures, for example, by changing the size and the density of the apertures.

In the display device according to the present invention, the transflector may be formed by a base member composed of a light transmissive material and a light-diffusing layer having fine particles dispersed in the base member and composed of a light transmissive material having a different refractive index from that of the base member. With this structure, the transmittivity and the reflectivity of the transflector can be adjusted by changing a difference in refractive indexes between the base material and the fine particles and also by changing the size and the density of the fine particles, and also, the unevenness of display can be prevented by the light-diffusing effects of the transflector. In particular, with this structure, the transmittance of the transflector can be easily made higher.

In the display device according to the present invention, the transflector may be formed by a base member composed of a light transmissive material and a light-diffusing layer having fine particles dispersed in the base member and composed of a reflective material. With this structure, since light is diffused by the fine particles dispersed in the base member and composed of a reflective material, the transmittivity and the reflectivity of the transflector can be adjusted by changing the size and the density of the fine particles, and also, the unevenness of display can be prevented by the light-diffusing effects of the transflector. In particular, with this structure, the reflectance of the transflector can be easily made higher.

In the display device according to the present invention, a light diffuser may be interposed between the first light-emitting surface of the light-guiding member and the first display unit. With this structure, since the light diffuser is interposed between the first light-emitting surface and the first display unit, the evenness of the illuminance distribution of the illumination unit can be improved, thereby further preventing the unevenness of display of the first display unit.

Meanwhile, the light diffuser may be formed so as to have different optical characteristics between the overlapping portion two-dimensionally overlapping the display area of the second display unit, of the region two-dimensionally overlapping the display area of the first display unit, and the portion of the region other than the overlapping portion. With this structure, the unevenness of display of the first display unit can be further prevented.

The light diffuser may be formed by a base member composed of a light transmissive material and a light-diffusing layer having fine particles dispersed in the base member and composed of a light transmissive material having a different refractive index from that of the base member. Alternatively, the light diffuser may be formed by a base member composed of a light transmissive material and a light-diffusing layer having fine particles dispersed in the base member and composed of a reflective material. Further alternatively, the light diffuser may be formed by a light diffusing layer composed of a light transmissive material and having a structure in which fine undulations are formed on the surface thereof.

Next, an electronic apparatus according to the present invention preferably includes any one of the above-mentioned display devices and controllers for controlling the display device. Especially, as the above electronic apparatus, a portable electronic apparatus is effective from the viewpoint of easily achieving a thin casing thereof.

DESCRIPTION OF PREFERRED EMBODIMENTS

Referring now to the accompanying drawings, preferred embodiments of display devices and an electronic apparatus according to the present invention will be described in detail.

First Embodiment

Figure 1:
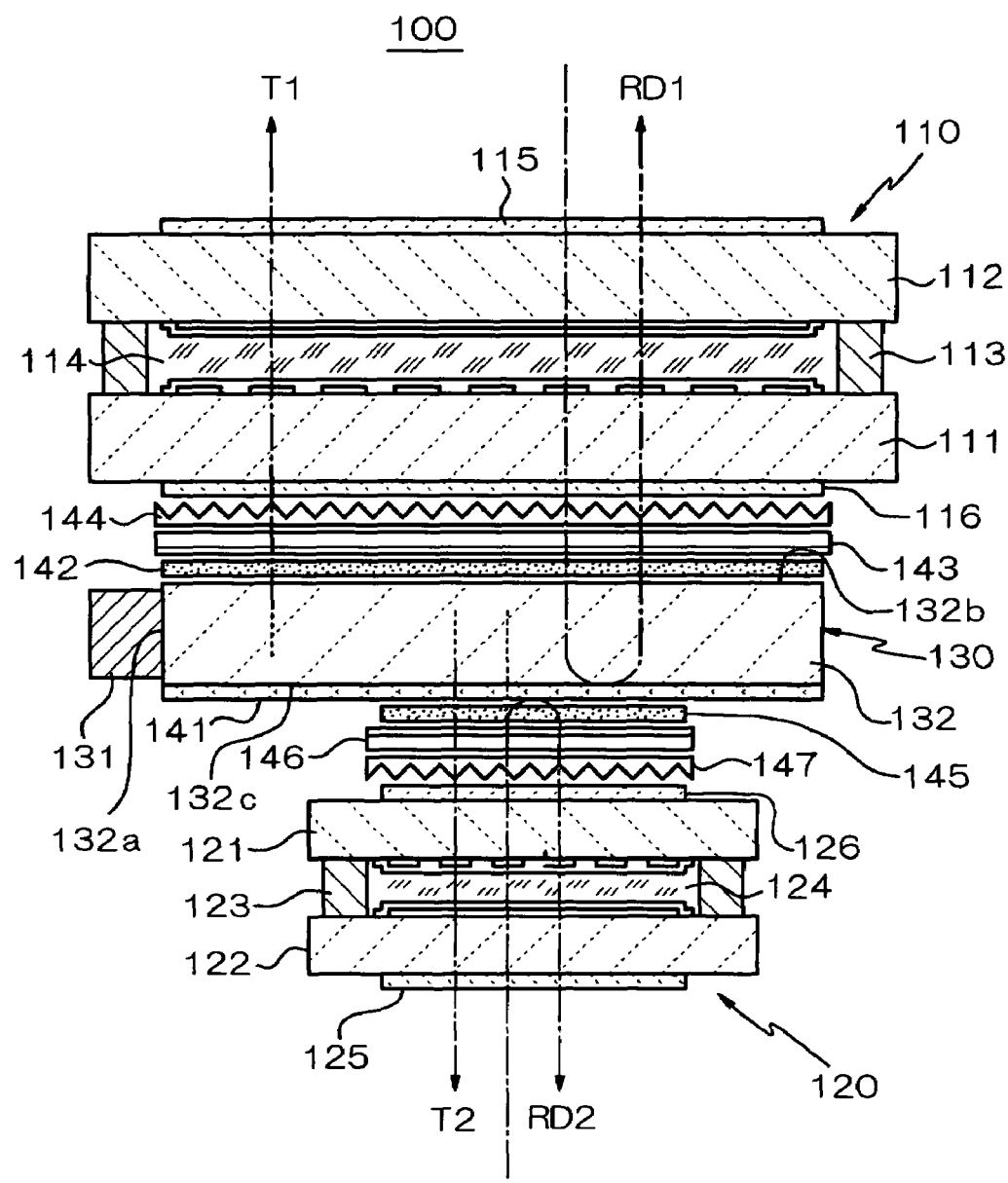
FIG. 1 is a sectional view schematically illustrating the structure of a display device according to a first embodiment of the present invention.

Referring first to FIG. 1, a liquid crystal display device 100 according to a first embodiment of the present invention will be described. The liquid crystal display device 100 includes a first display unit 110, a second display unit 120, and an illumination unit 130.

The first display unit 110 is a liquid crystal panel and is formed such that substrates 111 and 112 composed of glass or plastic are bonded to each other via a sealant 113 and have liquid crystal 114 interposed therebetween. The liquid crystal 114 is formed so as to receive predetermined electrical fields with electrodes formed on the inner surfaces of the substrates 111 and 112. The substrate 112 has a polarizer 115 disposed on the outer surface thereof, that is, on the front surface side or on the observing side of the first display unit, and the substrate 111 also has the polarizer 116 disposed on the outer surface thereof, that is, on the back surface side.

The second display unit 120 is also a liquid crystal panel and is formed such that substrates 121 and 122 composed of glass or plastic are bonded to each other via a sealant 123 and have liquid crystal 124 interposed therebetween. The liquid crystal 124 is formed so as to receive predetermined electrical fields with electrodes formed on the inner surfaces of the substrates 121 and 122. The substrate 122 has a polarizer 125 disposed on the outer surface thereof, that is, on the back surface side or the observing side of the second display unit, and the substrate 121 has a polarizer 126 on the outer surface thereof, that is, on the front surface side.

The first display unit 110 and the second display unit 120 have the illumination unit 130 interposed therebetween. The illumination unit 130 serves as a backlight. The illumination unit 130 includes a light source 131 formed by, for example, a cold cathode fluorescent tube or a light emitting diode (LED), and a light guiding plate 132 receiving light emitted from the light source 131. The light guiding plate 132 is composed of a transparent material such as an acrylic resin.

In the illumination unit 130, the light guiding plate 132 is a plate disposed so as to be orthogonal to an optical-axis direction of the display device, and the light source 131 is disposed along a side surface of the light guiding plate 132. The light guiding plate 132 is disposed such that a light incident surface 132a serving as a side surface thereof is opposed to the light source 131, a first light-emitting surface 132b serving as a front surface thereof, that is, an upper surface thereof in the figure, faces the first display unit 110, and a second light-emitting surface 132c serving as a back surface thereof in the figure, faces the second display unit 120.

The light guiding plate 132 is formed so as to output illumination light from the first light-emitting surface 132b toward the first display unit 110 and also to output illumination light from the second light-emitting surface 132c toward the second display unit 120 while allowing light received from the light source 131 to propagate therein. In the light guiding plate 132, light incident on the first light-emitting surface 132b and the second light-emitting surface 132c at an angle smaller than a critical angle is subjected to total reflection, and light incident on the same at the critical angle or greater is outputted outside from the first light-emitting surface 132b and the second light-emitting surface 132c. Especially, although not shown in the figure, either or both the first light-emitting surface 132b and the second light-emitting surface 132c may have undulated surfaces or scattering layers formed thereon serving as optical deflectors for outputting the light introduced from the light source 131 along or close to the optical axis directions of the first display unit 110 and the second display unit 120.

The second light-emitting surface 132c of the light guiding plate 132 and the second display unit 120 have a transflector 141 interposed therebetween. The transflector 141 suffices to have a structure in which part of illumination light from the illumination unit is reflected towards the front surface side and at least part of the remaining illumination light is transmitted therethrough towards the back surface side. Also, the transflector is made from, for example, a thin metal film or a metal film having a large number of fine apertures dispersed therein. In addition, the transflector 141 may be disposed while being bonded to the rear surface of the light guiding plate 132 or may be formed from a sheet or a plate independent of the light guiding plate 132. Meanwhile, although the transflector according to the present invention suffices to be interposed between the second light-emitting surface 132c of the illumination unit 130 and the second display unit 120 and has no limitations other than this, the following description is based on the assumption that the transflector 141 according to the present embodiment is basically formed so as to entirely cover the second light-emitting surface 132c of the light guiding plate 132 and to have two-dimensionally-uniform optical characteristics.

FIG. 2 illustrates example structures of the foregoing transflector 141. In the transflector having the example structure shown in FIG. 2(a), a reflective thin film 141B composed of a reflective material, for example, metal such as aluminum is formed on the front surface of a transparent substrate 141A composed of glass, a plastic film, or the like. White pigment such as white resin and titanium oxide, metals such as aluminum and silver, and so forth are preferred as the reflective material. The transflector having this example structure may be formed such that the light guiding plate 132 is used instead of the foregoing transparent substrate 141A and that the reflective thin film 141B is formed on the second light-emitting surface 132c. This applies likewise to the transflector having the other structures shown in FIGS. 2(b) to 2(e).

By making a thin film from metal such as aluminum or silver so as to have a thickness of about 10 nm to 50 nm, the reflective thin film 141B has an average transmittance of about 30% to 70% in a visible light range as its optical characteristic. The above thin film is formed by deposition, sputtering, laser ablation, or the like. The reflectance and the transmittance of the transflector having this example structure can be adjusted by changing the film thickness.

Also, the transflector may be made from a known dielectric multilayer film instead of the reflective material as mentioned above.

Figure 2A:
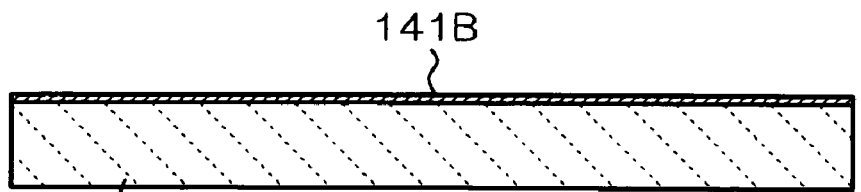
FIGS. 2(a) to 2(e) are sectional views schematically illustrating the structures of a transflector according to the first embodiment.
Figure 2B:
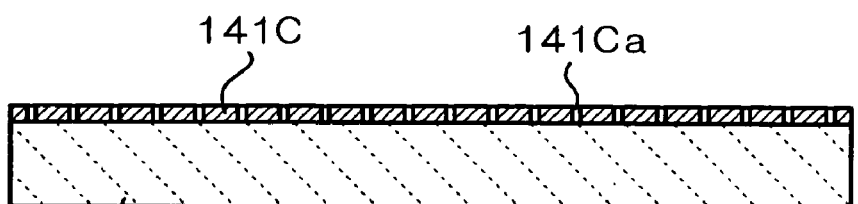

In the transflector having the example structure shown in FIG. 2(b), a reflective thin film 141C composed of a reflective material, for example, metal such as aluminum is formed on the front surface of the transparent substrate 141A. White pigment such as white resin and titanium oxide, metal such as aluminum and silver, and so forth are named as the reflective material. The reflective thin film 141C is formed so as to have an average reflectance of about 90% or more as a whole in the visible light range and also to have a large number of fine apertures 141Ca formed therein. The fine apertures 141Ca are dispersed over the entire surface of the reflective thin film 141C. An equivalent aperture diameter of each fine aperture 141Ca, that is, an aperture diameter of a round aperture having the same area as that of the fine aperture, is preferably about 1 µm to 100 µm, and is more preferably about 5 µm to 30 µm. Especially, the fine apertures are preferably formed so as to be smaller than the sizes of pixels of the first and second display units and also to be spaced at intervals smaller than the pitches of the pixels. The reflectance and the transmittance of the transflector having this example structure can be adjusted by changing the aperture area ratio of the fine apertures 141Ca. The aperture area ratio is determined by the equivalent aperture diameter and the formed density of the fine apertures 141Ca.

Figure 2C:
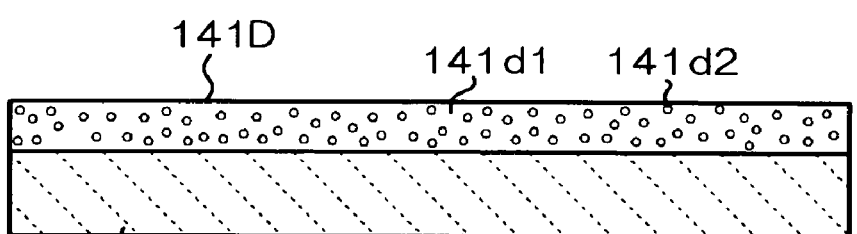

In the transflector having the example structure shown in FIG. 2(c), a light-diffusing layer 141D basically composed of a light transmissive material is formed on the front surface of the transparent substrate 141A. The light-diffusing layer 141D includes a transparent substrate 141d1 composed of acrylic resin or the like and fine particles 141d2 dispersed in the substrate 141d1. The substrate 141d1 and the fine particles 141d2 are composed of materials having different refractive indexes from each other. Particles composed of silica, acrylic resin, and the like are named as the fine particles. The diameters of the particles are preferably about 1 µm to 10 µm, and more preferably about 4 µm to 5 µm.

In the transflector having this example structure, since the particles having different refractive indexes from each other are dispersed in the substrate, light is scattered or dispersed in a macroscopic view, whereby the transflector having this example structure exhibits optical characteristics reflecting part of the light and transmitting the remaining light therethrough. The reflectance and the transmittance of the transflector having this example structure can be adjusted by changing a difference in refractive indexes between the substrate and the particles, the size and the distribution density of the particles, and the like.

Figure 2D:
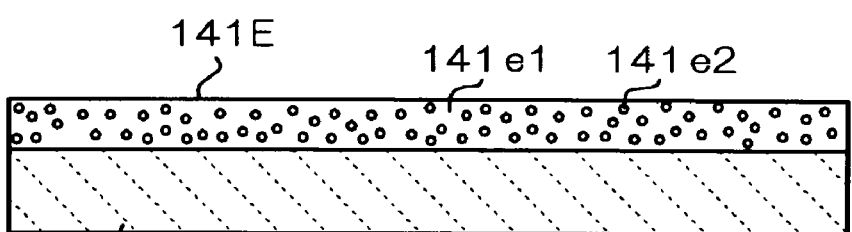

In the transflector having the example structure shown in FIG. 2(d), a light-diffusing layer 141E basically composed of a light transmissive material is formed on the front surface of the transparent substrate 141A. The light-diffusing layer 141E includes a transparent substrate 141e1 composed of acrylic resin or the like and light reflective fine particles 141e2 dispersed in the substrate 141e1. The fine particles 141e2 are composed of a reflective material. White pigment such as white resin and titanium oxide, metal such as aluminum and silver, and so forth are preferred as the reflective material. The diameters of the particles 141e2 are preferably about 1 µm to 10 µm, and more preferably about 2 µm to 3 µm.

In the transflector having this example structure, since the particles composed of a reflective material are dispersed in the substrate, light is scattered or dispersed in a macroscopic view, whereby the transflector having this example structure exhibits optical characteristics reflecting part of the light and transmitting the remaining light therethrough. The reflectance and the transmittance of the transflector having this example structure can be adjusted by changing the reflectance, the size, and the density of the particles, and the like.

Figure 2E:
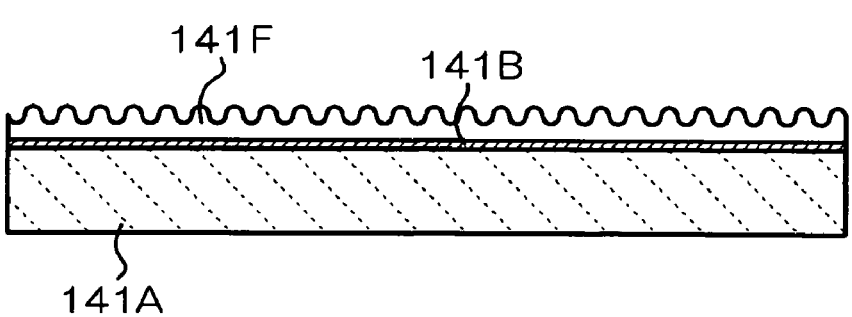

In the transflector having the example structure shown in FIG. 2(e), the reflective thin film 141B, the same as that shown in FIG. 2(a) composed of a reflective material, is formed on the front surface of the transparent substrate 141A, and a diffusing layer 141F composed of a light transmissive material, preferably of a transparent material, and having fine undulations on the surface thereof is additionally formed on the thin film 141B. The surface undulation of the diffusing layer 141F has a depth of about 2 µm to 3 µm formed at an interval of, for example, about 1 µm to 10 µm, preferably about 3 µm to 4 µm. This surface undulation is formed by patterning such as photolithography. For example, the above-mentioned surface undulation is formed such that after application on the reflective thin film 141B, a transparent photosensitive resin is exposed with a mask pattern having openings formed with an interval corresponding to the above-mentioned surface undulation and is then developed. Meanwhile, a step of additionally applying an additional transparent resin on the foregoing developed transparent resin or heating the developed transparent resin so as to be softened may be added so as to provide a smooth surface undulation.

According to this example structure, the transflector obtains reflection and transmission characteristics in accordance with the thickness of the reflective thin film 141B in the same fashion as mentioned above, and also is provided with a light-diffusing function since light incident on and reflected at the reflective thin film 141B is scattered by the diffusing layer 141F, thereby improving the evenness of the luminance distributions of the first display unit 110 and the second display unit 120.

Also, the light guiding plate 132 and the first display unit 110 have a light diffuser 142 interposed therebetween. The light diffuser 142 is intended to prevent the unevenness of display, that is, the uneven brightness across the display surface of the fist display unit, caused by the structures of the light guiding plate 132 and the other components lying on the back surface side thereof, that is, lying on the lower side in the figure, by appropriately diffusing light emitted from the light guiding plate 132. The light diffuser 142 may have an example structure in which fine particles composed of an acrylic resin or the like and having an example diameter of about 2 µm to 3 µm are dispersed in a base material composed of an acrylic resin or the like having a different refractive index from that of the fine particles, or in which fine undulations are provided on the surface thereof. More particularly, the light diffuser 142 may have the same structure as those shown in FIG. 2(c) or 2(d), or a structure formed by removing the reflective thin film 141B from the structure shown in FIG. 2(e). The light diffuser 142 may be disposed while being bonded to the front surface of the light guiding plate 132 or may be formed from a sheet or a plate independent of the light guiding plate 132.

Also, a light diffuser 145 is interposed between the light guiding plate 132 and the second display unit 120, and is interposed between the transflector 141 and the second display unit 120 according to the present embodiment. The light diffuser 145 has the same structure as that of the light diffuser 142.

Meanwhile, in the present embodiment, since an overlapping portion, lying in a region two-dimensionally overlapping the display area of the first display unit 110 and two-dimensionally overlapping the display area of the second display unit 120, and the remaining portion lying in the region have different optical structures from each other, in order to improve the evenness of the display surface of the first display unit, the foregoing light diffuser may be formed such that the overlapping portion and the remaining portion have different diffusion rates, for example, haze values, from each other.

In the present embodiment, in order to increase the percentage of light substantially contributing to display in each of the first display unit 110 and the second display unit 120, light collectors 143 and 144, that is, prism sheets 143 and 144 are interposed between the illumination unit 130 and the first display unit 110, and light collectors 146 and 147, that is, prism sheets 146 and 147 are interposed between the illumination unit 130 and the second display unit 120. Each light collector has a prism surface for refracting light so as to direct the light along or close to an optical-axis direction of the display device, that is, the vertical direction in the figure. More particularly, the prism surface is formed by a plurality of ribs/convex portions, each having a triangular cross section, juxtaposed with each other in a stripe pattern on the surface of the corresponding collector. The light collectors 143 and 144 as well as the light collectors 146 and 147 are disposed such that the foregoing corresponding ribs extend along directions substantially perpendicular to each other.

Next, an operation of the display device according to the present embodiment and having the above-described structure will be described. In the following description, for simplicity of description, it is assumed that both the first display unit 110 and the second display unit 120 serving as liquid crystal panels are formed so as to perform display in a TN-type liquid crystal mode, that the polarizer 115 transmits linearly polarized light A having a plane of vibration parallel to the plane of the figure, that is, first polarized light, and reflects linearly polarized light B having a plane of vibration orthogonal to the plane of the figure, that is, second polarized light, and that the polarizer 116 transmits the linearly polarized light B, that is, third polarized light, and absorbs the linearly polarized light A, that is, a fourth polarized light. In addition, it is assumed that the polarizer 125 transmits the linearly polarized light A and absorbs the linearly polarized light B, and that the polarizer 126 transmits the linearly polarized light B and absorbs the linearly polarized light A. That is, although directional relationships among the planes of vibration of the first polarized light to the fourth polarized light are generally arbitrary, in the following description, the first polarized light and the fourth polarized light exhibit the same polarized state as each other, and the second polarized light and the third polarized light exhibit the same polarized state as each other.

Light emitted from the light source 131 is introduced in the light guiding plate 132 and is emitted little by little therefrom towards the front and back surface sides while propagating in the light guiding plate 132. First, illumination light emitted towards the first display unit 110 passes through the light diffuser 142, becomes the linearly polarized light B upon passing through the polarizer 116, passes through the light collectors 143 and 144, and is then incident on the liquid crystal 114. When the liquid crystal 114 is in an OFF-state, upon passing through the liquid crystal 114, the illumination light becomes the linearly polarized light A due to the optical rotary power of the liquid crystal, passes through the polarizer 115, and is emitted towards the front surface side as transmissive light T1. When the liquid crystal 114 is in an ON-state, since the illumination light remains as the linearly polarized light B even when passing through the liquid crystal 114, it is absorbed by the polarizer 115.

In the meantime, external light incident on the first display unit 110 becomes the linearly polarized light A upon passing through the polarizer 115 and is incident on the liquid crystal 114. When the liquid crystal 114 is in an OFF-state, the external light becomes the linearly polarized light B, is transmitted through the polarizer 116, and enters the light guiding plate 132, and then, part of this light is reflected at the transflector 141, becomes the linearly polarized light A upon passing again through the polarizer 116 and the liquid crystal 114, is transmitted through the polarizer 115, and is emitted as reflective light RD1. Also, when the liquid crystal 114 is in an ON-state, since the linearly polarized light A of the external light passing through the polarizer 115 remains as the linearly polarized light A even when passing through the liquid crystal 114, it is absorbed by the polarizer 116.

Meanwhile, when the foregoing light collectors 143 and 144 are disposed, since external light is scattered upon being incident on these light collectors, the reflective light RD1 is not substantially obtained. Accordingly, when it is expected to effectively use the foregoing reflective light RD1, it is preferable that none of these light collectors be disposed.

Next, part of illumination light emitted from the illumination unit 130 towards the second display unit 120 is transmitted through the transflector 141, passes through the light diffuser 145, becomes the linearly polarized light B upon passing through the polarizer 126, and passes through the liquid crystal 124. When the liquid crystal 124 is in an OFF-state, upon passing through the liquid crystal 124, the linearly polarized light B becomes the linearly polarized light A, is transmitted through the polarizer 125, and is emitted as transmissive light T2 towards the back surface side. When the liquid crystal 124 is in an ON-state, since the linearly polarized light B remains as it is even when passing through the liquid crystal 124, it is absorbed the polarizer 125.

In the meantime, of external light incident on the second display unit 120, the linearly polarized light A is transmitted through the polarizer 125 and is incident on the liquid crystal 124. When the liquid crystal 124 is in an OFF-state, the linearly polarized light A becomes the linearly polarized light B and passes through the polarizer 126 and the light diffuser 143, and then, part of this light is reflected at the transflector 141 while other part of the light is introduced in the light guiding plate 132. The linearly polarized light B reflected at the transflector 141 passes through the light diffuser 145 and the polarizer 126 as it is, becomes the linearly polarized light A upon passing again through the liquid crystal 124, is transmitted through the polarizer 125, and is emitted as reflective light RD2. When the liquid crystal 124 is in an ON-state, since the above-mentioned linearly polarized light A remains as it is even when passing through the liquid crystal 124, it is absorbed by the polarizer 126.

Meanwhile, when the foregoing light collectors 146 and 147 are disposed, since external light is scattered upon being incident on these light collectors, the reflective light RD2 is not substantially obtained. Accordingly, when it is expected to effectively use the foregoing reflective light RD2, it is preferable that none of these light collectors be disposed.

As described above, in the present embodiment, the first display unit 110 performs display with the transmissive light T1 and the reflective light RD1. Also, the second display unit 120 performs display with the transmissive light T2 and the reflective light RD2. The presence of the reflective light RD1 and the reflective light RD2 prevents deterioration in visibility of display in the case of observing an object at a bright place like outdoors or in the case of cutting an amount of illumination light of the illumination unit 130.

In the present embodiment, the illumination unit 130 is formed so as to emit light towards both the first display unit 110 and the second display unit 120, and in particular, the light guiding plate 132 interposed between the first display unit 110 and the second display unit 120 is shared by them, thereby making the overall structure of the display device 100 thin and light. Also, with the transflector 141 disposed as mentioned above, light in the light guiding plate 132 can be divided towards both the first display unit 110 and the second display unit 120 respectively disposed on the front and back sides, the evenness of illumination light emitted from the light guiding plate 132 towards each of the front and back sides can be improved, and also, external light incident on the first display unit 110 and the second display unit 120 can be reflected at the transflector so as to serve as part of display light.

In particular, with the presence of the transflector 141, the illuminance distribution of the illumination unit 130 on the first display unit 110 is unlikely to be optically affected by the presence of the second display unit 120. With this structure, even when the display area of the first display unit 110 is set greater than that of the second display unit 120 as shown in the figure, a shadow of the display area of the second display unit 120 is unlikely to be reflected in the display surface of the first display unit 110, thereby improving the display quality of the first display unit 110.

Meanwhile, as mentioned above, although the display areas of the first and second display units 110 and 120 overlap with each other, in the case where the one includes the other or in the case where the two display areas do not partially overlap with each other, the unevenness of display becomes generally noticeable. Hence, the above-described structure is especially effective in these cases. However, regardless of the above-mentioned cases, when a common illuminator is used to illuminate the display units lying on both the front and back sides, the unevenness of the illuminance distribution of the illumination unit is in general likely to occur. Hence, different from the above cases, even when both the display areas have almost the same size as each other and overlap so as to align two-dimensionally with each other, the structure of the display device according to the present invention is technically effective in order to achieve the evenness of the luminance of each of the display units.

Second Embodiment

Referring next to FIG. 3, a display device according to a second embodiment of the present invention will be described. Since the display device according to the second embodiment basically has the same structure as that of the display device according to the first embodiment shown in FIG. 1 except for its transflector, illustrations and descriptions of the same parts in the second embodiment will be omitted.

Figure 3A:
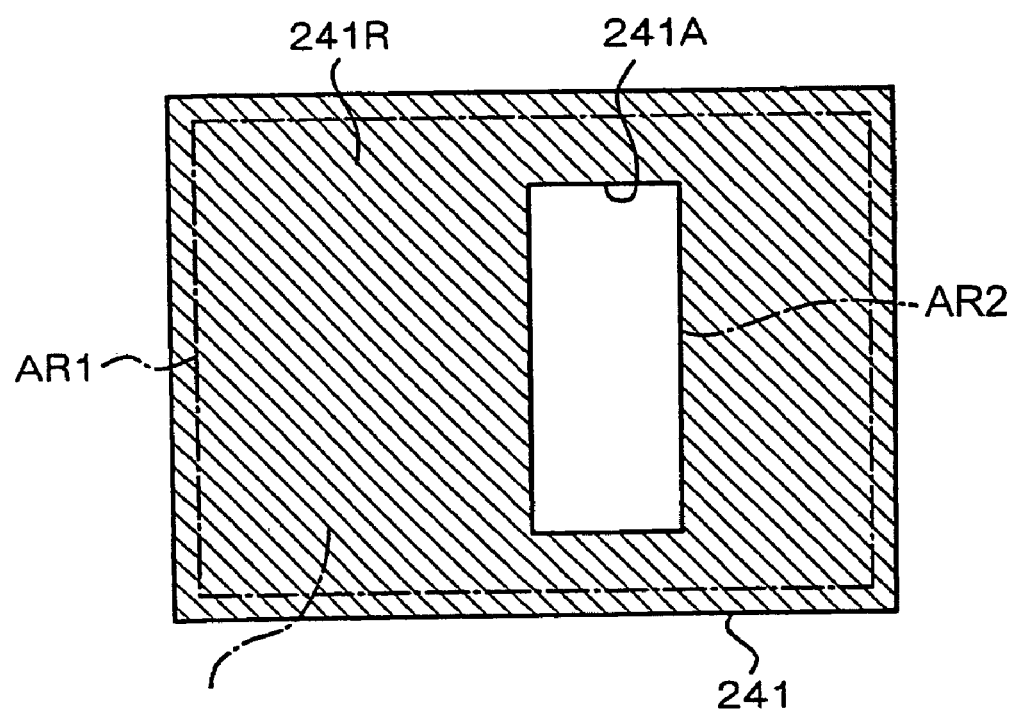
FIGS. 3(a) and 3(b) are plan views schematically illustrating the structures of a transflector according to a second embodiment of the present invention.

As shown in FIG. 3(a), a transflector 241 according to the present embodiment is interposed between the second light-emitting surface 132c of the light guiding plate 132 and the second display unit 120 so as to entirely cover a region AR1 two-dimensionally overlapping the display area of the first display unit 110. The transflector 241 has an overlapping portion AR2 which two-dimensionally overlaps the display area of the second display unit 120 and which serves as an aperture 241A, and in the region AR1, a portion AR3 other than the overlapping portion AR2 serves as a reflector 241R reflecting visible light.

With this structure, the second display unit 120 is illuminated with light emitted from the light guiding plate 132 and passing through the aperture 241A, thereby easily achieving bright display of the second display unit 120. Also, with respect to the first display unit 110, since substantially all light is reflected at the portion AR3, an amount of light contributing to display as a whole can be increased. However, in this case, since the intensity of the illumination light illuminating the first display unit 110 decreases in the overlapping portion AR2, it is preferable that the display device preferably have a structure in which the intensity distribution of the illumination light can be modified by adjusting a light-diffusing effect of the light diffuser 142, a light-emitting distribution of the light guiding plate 132, and the like.

Figure 3B:
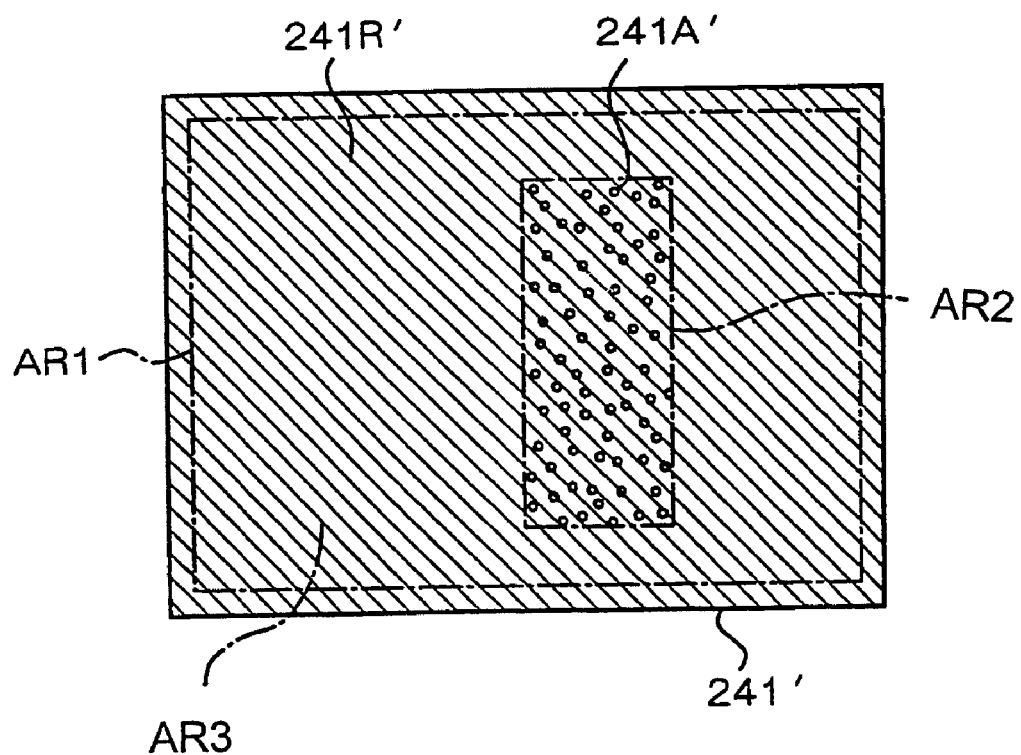

FIG. 3(b) illustrates a modification of the present embodiment. A transflector 241' according to the modification is formed such that a large number of fine apertures 241A' are dispersed in the reflective surface of the overlapping portion AR2 and that a portion other than the overlapping portion AR2 has no apertures and serves as the reflector 241R' reflecting light. In this modification, the second display unit 120 is illuminated with light passing through the fine apertures 241A' formed in the overlapping portion AR2. However, in the overlapping portion AR2, since light is reflected at the reflective surface other than the fine apertures 241A' towards the first display unit 110, a difference in brightness of display between two parts of the display surface of the first display unit 110 respectively corresponding to the overlapping portion AR2 and the remaining portion AR3 can be reduced. Meanwhile, also in this case, in order to further prevent the unevenness of display of the first display unit 110, it is preferable that the display device have a structure in which the intensity distribution of the illumination light can be modified by adjusting a light-diffusing effect of the light diffuser 142, a light-emitting distribution of the light guiding plate 132, and the like.

Third Embodiment

Referring next to FIG. 4, a display device according to a third embodiment of the present invention will be described. Since the display device according to the present embodiment basically has the same structure as that of the display device according to the first embodiment shown in FIG. 1 except for its transflector, illustrations and descriptions of the same parts in the third embodiment will be omitted.

Figure 4A:
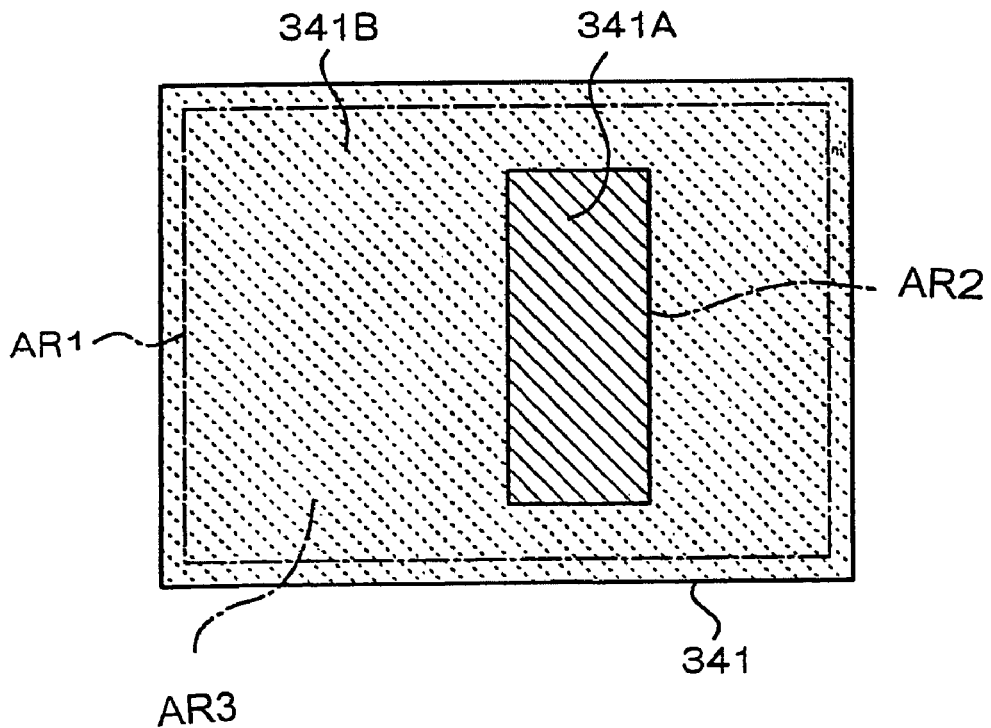
FIGS. 4(a) and 4(b) are plan views schematically illustrating the structures of a transflector according to a third embodiment of to the present invention.

As shown in FIG. 4(a), in the region AR1, a transflector 341 is formed such that the overlapping portion AR2 is composed of a transflective material 341A having a predetermined reflectance and transmittance, for example, both in the range from 30 to 70%, and the portion AR3 other than the overlapping portion AR2 is composed of a reflective material 341B having a lower transmittance than that of the overlapping portion AR2 while having substantially the same reflectance as that of the overlapping portion AR2, for example, in the range from 30 to 70%. It is preferable that the transmittance of the reflective material 341B of the portion AR3 be nearly 0%. Such a material is easily obtained, especially from a dielectric multilayer film.

With this structure, the overlapping portion AR2 in the region AR1 allows illumination light emitted from the illumination unit 130 to be reflected towards the first display unit 110 and to be transmitted therethrough towards the second display unit 120 at the same time, whereby both display units can be illuminated at the same time. In addition, the portion AR3 other than the overlapping portion AR2 does not allow unnecessary light to be transmitted therethrough towards the back thereof because of its low transmittance, and also, since the reflectance of the portion AR3 is substantially the same as that of the overlapping portion AR2, the unevenness of display of the first display unit 110 can be prevented.

According to this example structure, when it is intended to remove the unevenness of display of the first display unit 110, a light loss of illumination light due to absorption by the portion AR3 is generated, whereby a light utilization efficiency of the display device as a whole decreases. In order to improve the light utilization efficiency, it is necessary to reduce the light loss in the portion AR3 by making the reflectance of the portion AR3 higher relative to that of the overlapping portion AR2, and it is preferable that the unevenness of display of the first display unit 110 possibly caused by this arrangement be modified by changing the structures of the light-guiding plate 132, the light diffuser 142, and so forth.

Figure 4B:
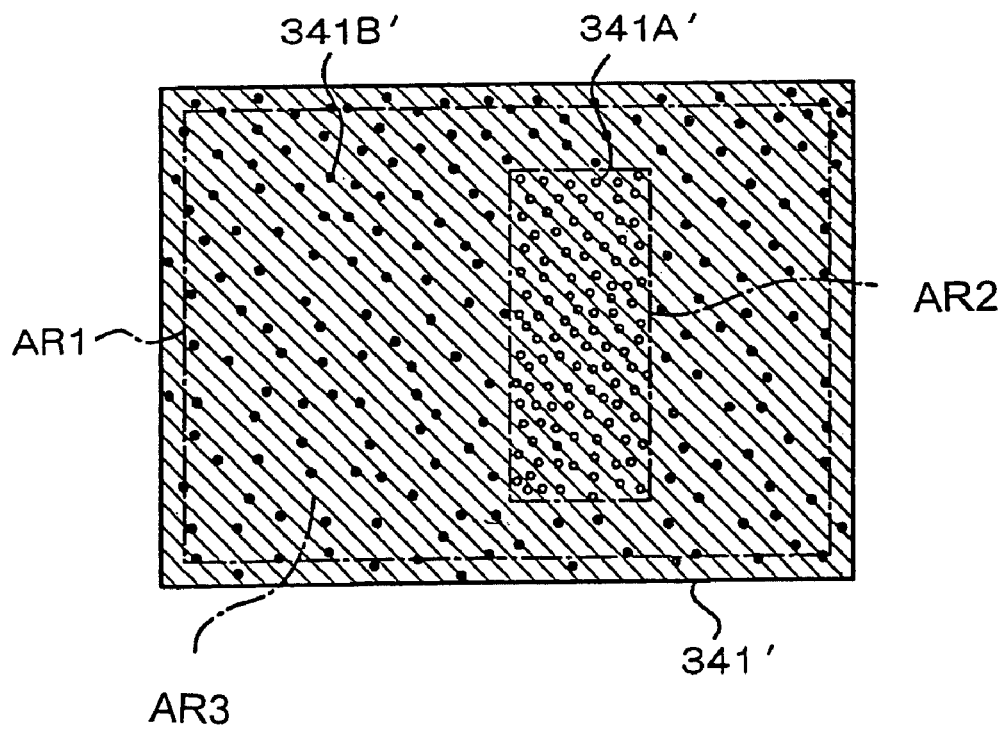

FIG. 4(b) illustrates a modification of the present embodiment. An entire transflector 341' is composed of a reflective material. The transflector 341' has a large number of fine apertures 341A' dispersed in the overlapping portion AR2, and, in place of the fine apertures 341A', also has fine absorbers 341B' composed of a black resin or the like and dispersed in the portion AR3 other than the overlapping portion AR2.

The transflector 341' has a structure in which the fine apertures 341A' in the overlapping portion AR2 allow the second display unit 120 lying at the back thereof to be illuminated with light, and also the fine absorbers 341B' formed in the remaining portion AR3 reduce a difference in reflectances between the overlapping portion AR2 and the portion AR3. With this structure, the unevenness of display of the first display unit 110 can be prevented.

Fourth Embodiment

Referring next to FIG. 5, a display device according to a fourth embodiment of the present invention will be described. The display device according to the present embodiment has a structure in which any one of the display devices according to the foregoing embodiments is accommodated in a casing composed of a synthetic resin, or the like. Accordingly, since the display device of the present embodiment basically has the same structure as that of the display device according to the first embodiment shown in FIG. 1 except for its structural feature of accommodation with the casing, illustrations of the same parts in the present embodiment will be simplified and descriptions of the same parts will be omitted.

Figure 5A:
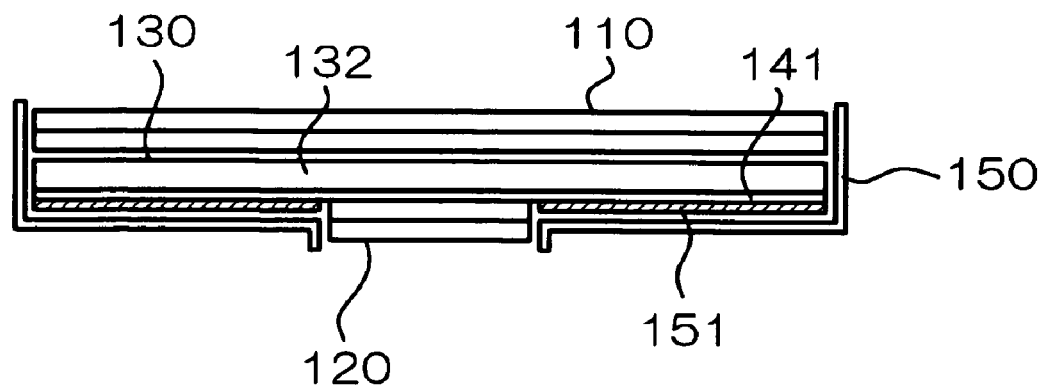
FIGS. 5(a) and 5(b) are sectional views schematically illustrating the structures of display devices according to a fourth embodiment of to the present invention.

As shown in FIG. 5(a), a display device 100' includes the first display unit 110, the second display unit 120, the illumination unit 130, and the other foregoing components (not shown), which are the same as those of each of the display devices according to the foregoing embodiments, and these components are accommodated in a casing 150. The casing 150 is composed of, for example, a white synthetic resin. Making the casing 150 from a white material is preferable from the viewpoint of improving a utilization efficiency of illumination light of the illumination unit 130 since this casing reflects light leaked from the light guiding plate 132 and returns again to the light guiding plate 132.

In the present embodiment, an area not having the second display unit 120 disposed therein, on the front surface of the second light-emitting surface of the light guiding plate 132 of the illumination unit 130, that is, the foregoing portion AR3, has an optical sheet 151 having predetermined optical characteristics and disposed therein. When viewed from the first display unit 110, the optical sheet 151 is composed of a material having substantially the same reflectance as that of the second display unit 120. With this structure, even when the transflector 141 has entirely uniform optical characteristics, the unevenness of display of the display surface of the first display unit can be decreased.

Figure 5B:
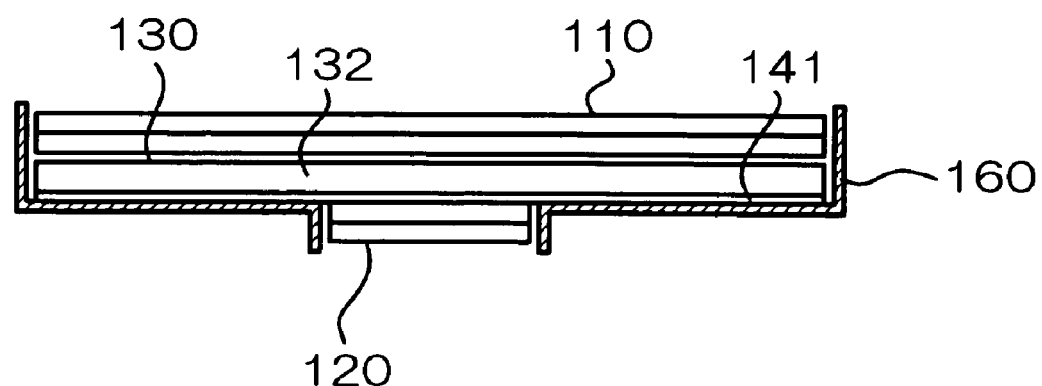

FIG. 5(b) illustrates a modification of the present embodiment. In a display device 100" according to this modification, the first display unit 110, the second display unit 120, the illumination unit 130, and the other components (not shown), which are the same as those of each of the display devices according to the foregoing embodiments, are accommodated in a casing 160. When viewed from the first display unit 110, the casing 160 is composed of a material exhibiting substantially the same reflectance as that of the second display unit 120. With this structure, even when the foregoing transflector 141 has entirely uniform optical characteristics, the unevenness of display of the display surface of the first display unit can be decreased.

Meanwhile, the optical sheet 151 and the casing 160 suffice to be formed such that, when observed from the first display unit 110 via the illumination unit 130, the illuminance distributions of a portion where the display area of the second display unit 120 presents and another portion where the optical sheet 151 and the casing 160 are disposed are mutually made uniform regardless of the structures of the transflector 141 and the light guiding plate 132.

Fifth Embodiment

Figure 6:
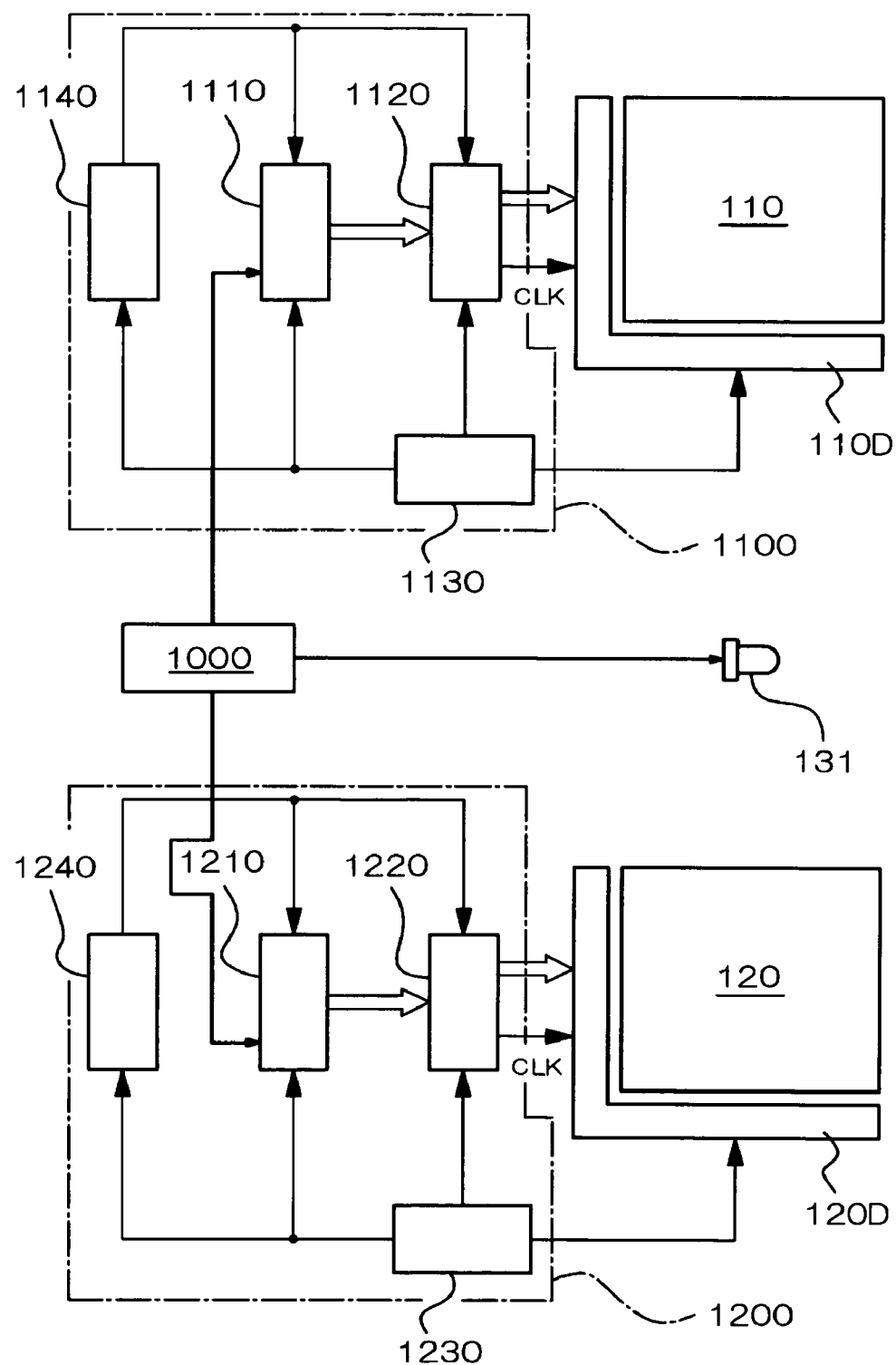
FIG. 6 is a structural block diagram illustrating the structure of an example electronic apparatus.
Figure 7A:
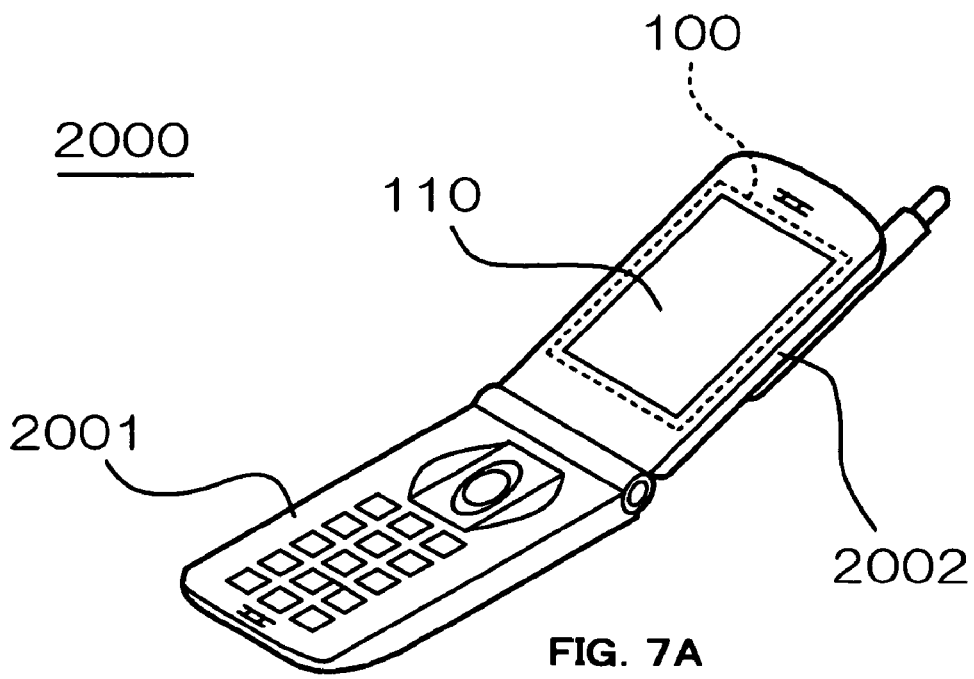
FIGS. 7(a) and 7(b) are perspective views schematically illustrating the structure of a cellular phone serving as the example electronic apparatus.
Figure 7B:
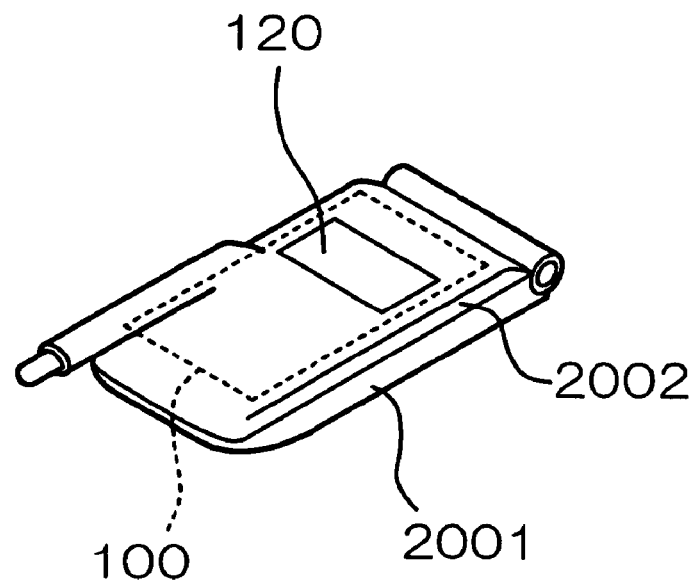

Referring next to FIGS. 6 and 7, an electronic apparatus, including the display device 100 according to the first embodiment, will be described. As shown in FIG. 6, the electronic apparatus according to the present embodiment includes a controller 1100 for controlling the first display unit 110, that is, the liquid crystal display panel 110, and a controller 1200 for controlling the second display unit 120, that is, the liquid crystal display panel 120. The controllers 1100 and 1200 are controlled by a central controller 1000 disposed in the electronic apparatus and formed by a microcomputer and so forth.

The first and second display units 110 and 120 are respectively connected to drive circuits 110D and 120D including semiconductor ICs and the like, which are mounted on the corresponding panels or connected to the corresponding panels via respective wiring members, and these drive circuits 110D and 120D are respectively connected to the controllers 1100 and 1200. The controllers 1100 and 1200 respectively include display-information output sources 1110 and 1210, display-information process circuits 1120 and 1220, power supply circuits 1130 and 1230, and timing generators 1140 and 1240.

Each of the display-information output sources 1110 and 1210 includes a memory such as a read only memory (ROM) and/or a random access memory (RAM), a storage unit such as a magnetic storage disk and/or an optical storage disk, and a tuning circuit for outputting a tuned digital image signal. Also, in response to a variety of clock signals generated by the timing generators 1140 and 1240, the display-information output sources 1110 and 1210 supply display information, in the form of an image signal according to a predetermined format or the like, to the display-information process circuits 1120 and 1220, respectively.

Each of the display-information process circuits 1120 and 1220 includes a variety of known circuits such as a serial-parallel conversion circuit, an amplification and reversion circuit, a rotation circuit, a gamma correction circuit, and a clamp circuit, processes the input display information, and supplies the processed image information together with a clock signal CLK to the corresponding drive circuit. Each of the drive circuits 110D and 120D includes a scan-line drive circuit, a data-line drive circuit, and a testing circuit. Also, each of the power supply circuits 1130 and 1230 supplies a predetermined voltage to each of the above described corresponding components.

The central controller 1000 sends original data for illumination lights-on and -off commands and display information, and the like, if needed, to the display-information output sources 1110 and 1210 of the corresponding controllers 1100 and 1200, controls the display-information output sources 1110 and 1210 so as to output display information in response to the original data and the like, and also controls the first display unit 110 and the second display unit 120 so as to display required display images via the controllers 1100 and 1200 and the drive circuits 110D and 120D, respectively. Also, the central controller 1000 is formed so as to control the illumination lights-on and -off, and the like of the light source 131.

FIG. 7 illustrates a cellular phone 2000 serving as an example of the electronic apparatus according to the present invention. The cellular phone 2000 includes a main body 2001 having a variety of buttons disposed thereon and a microphone housed therein, and a display unit 2002 having a display screen and an antenna mounted thereon and a speaker housed therein, and the main body 2001 and the display unit 2002 are constructed so as to be mutually foldable. The display unit 2002 has the display device 100 housed therein, while having the display screen of the first display unit 110 disposed on the inner surface thereof so as to be visible and also the display screen of the second display unit 120 disposed on the outer surface thereof so as to be visible.

In the present embodiment, as shown in FIG. 7(*a*), when the display unit 2002 is opened by separating from the main body 2001, in response to a command from the central controller 1000, the first display unit 110 is illuminated, and a predetermined image is displayed. Also, as shown in FIG. 7(*b*), when the display unit 2002 is folded onto the main body 2001, the first display unit 110 is illumination lights-off, the second display unit 120 is illuminated instead of the above illumination lights-off, and a predetermined image is displayed.

In the present embodiment, the display device 100 having a thin structure as mentioned above allows the display unit 2002 to have a thin structure, to have a simple internal structure, and to be easily assembled. Meanwhile, the electronic apparatus according to the present embodiment may also have any one of the display devices in the second to fourth embodiments mounted thereon.

Meanwhile, the electro-optical device and the electronic apparatus according to the present invention are not limited to the foregoing example illustrations, and those skilled in the art will appreciate that a variety of modifications can be possible without departing from the spirit of the present invention. For example, although a liquid crystal display panel is used as an electro-optical panel in each of the foregoing embodiments, any one of a variety of electro-optical panels such as an organic electro-luminescence panel, a plasma display panel, and a field-emission display panel may also be used as the electro-optical panel according to the present invention. Also, although the liquid crystal display panel of a passive matrix type is basically illustrated in the foregoing embodiments, the present invention is likewise applicable to that of an active matrix type.

The entire disclosure of Japanese Patent Application No. 2002-316081 filed Oct. 30, 2002 is incorporated by reference.

What is claimed is:

1. A display device, comprising:
a first display unit having a display area;
a second display unit having a display area facing in an opposite direction than the display area of the first display unit, the display area of the second display unit being smaller than the display area of the first display unit;
an illumination unit disposed between the first display unit and the second display unit and illuminating light onto both the first display unit and the second display unit, the illumination unit including a light guide member having a first light emitting surface facing the first display unit and a second light emitting surface facing away from the first light emitting surface; and
an optical sheet disposed at the second light emitting surface of the illumination unit at a position that is in an overlapping condition with the display area of the first display unit in plan view and is in a non-overlapping condition with the display area of the second display unit in plan view.

2. The display device of claim 1, further comprising an aperture disposed within the optical sheet, the second display unit being located in the aperture.

3. The display device of claim 1 wherein:
outer edges of the second display unit are inboard of outer edges of the first display unit.

4. A display device comprising:
a first display unit having a display area;
a second display unit having a display area that is smaller than the display area of said first display unit;
an illumination unit between said first display unit and said second display unit;
an optical sheet that overlaps the display area of said first display unit in plan view and does not overlap the display area of said second display unit in plan view; and
wherein said optical sheet includes an aperture, and the display area of said second display unit is aligned with said aperture.

5. The display device of claim 4, wherein said optical sheet has at least substantially the same reflectance as said second display unit.

6. The display device of claim 4, wherein said first display unit overlaps said second display unit as well as a region beyond said second display unit.

7. A display device comprising:
a first display unit;
a second display unit that is smaller than the first display unit;
an illumination unit between said first display unit and said second display unit; and
an optical sheet that overlaps with the first display unit in plan view, the optical sheet having an aperture, at least a portion of said second display unit overlapping said first display unit through the aperture in said optical sheet.

8. A cellular phone comprising:
the display device of claim 7.

9. The display device of claim 7 further comprising a casing having at least a white inner surface, with a side wall of the casing confronting a side edge of the illumination unit.

10. The display device of claim 7 wherein:
outer edges of the second display unit are inboard of outer edges of the first display unit.

11. A display device comprising:
a first display unit;
a second display unit that is smaller than said first display unit;
an illumination unit between said first display unit and said second display unit; and
an optical sheet that overlaps with said first display unit in plan view, said optical sheet having an aperture at a position that corresponds to the position of said second display unit.

12. A cellular phone comprising:
the display device of claim 11.

13. The display device of claim 11 further comprising a casing having at least a white inner surface, with a side wall of the casing confronting a side edge of the illumination unit.

14. The display device of claim 11 wherein:
outer edges of the second display unit are inboard of outer edges of the first display unit.

15. A display device comprising:
a first display unit with two outer peripheral edges of opposite ends thereof;
a second display unit with two outer peripheral edges on opposite ends thereof, the two outer peripheral edges of said second display panel being inboard of the two outer peripheral edges of said first display unit;
an illumination unit between said first display unit and said second display unit; and
an optical sheet with two outer peripheral edges on opposite ends thereof, the two outer peripheral edges of said optical sheet being outboard of the two outer peripheral edges of said second display unit, said optical sheet having an aperture inboard of the two outer peripheral edges of said first display unit, at least a portion of said second display unit facing said first display unit through the aperture in said optical sheet.

16. A cellular phone comprising:
the display device of claim 15.

17. The display device of claim 15 further comprising a casing having at least a white inner surface, with a side wall of the casing confronting a side edge of the illumination unit.

* * * * *